United States Patent [19]

Ausmus

[11] 4,155,416

[45] May 22, 1979

[54] OCCUPANT-OPERATED MOBILE WORK VEHICLE FOR PARAPLEGICS

[76] Inventor: Donald L. Ausmus, 14311 E. 39th Ter., Independence, Mo. 64055

[21] Appl. No.: 762,445

[22] Filed: Jan. 26, 1977

[51] Int. Cl.[2] .............................................. B62D 61/06

[52] U.S. Cl. ............................... 180/26 R; 180/65 R; 297/DIG. 10

[58] Field of Search ................. 180/26 R, 65 R, 77 R, 180/DIG.3; 280/242 WC; 297/DIG. 4, DIG. 10, 384, 358; 5/89 R

[56] References Cited

U.S. PATENT DOCUMENTS

| | | | |
|---|---|---|---|
| 2,482,203 | 9/1949 | Peterson | 180/26 R X |
| 2,572,149 | 10/1951 | Hind | 297/DIG. 10 |
| 3,137,869 | 6/1964 | Johnson | 180/26 R |
| 3,629,880 | 12/1971 | van Rhyn | 297/DIG. 10 X |
| 3,894,601 | 7/1975 | Gestring | 180/26 R |
| 4,054,319 | 10/1977 | Fogg, Jr. | 297/DIG. 10 X |

FOREIGN PATENT DOCUMENTS

| | | | |
|---|---|---|---|
| 2131883 | 1/1973 | Fed. Rep. of Germany | 297/DIG. 10 |
| 2265348 | 10/1975 | France | 180/26 R |

*Primary Examiner*—Joseph F. Peters, Jr.
*Assistant Examiner*—Terrance L. Siemens
*Attorney, Agent, or Firm*—Sheridan, Ross, Fields & McIntosh

[57] ABSTRACT

An occupant-operated motorized vehicle for supporting paraplegics in a standing posture for working with their hands comprising a three-wheeled chassis steered by its rear single wheel, a platform upon which the occupant stands, waist and hip supports for holding the occupant erect and supporting the occupant against backward movement, a rotatable upper body support member for supporting the occupant's upper body against forward movement and adapted to be locked at a desired angle to support the occupant's upper body in various positions as necessary to reach work areas with his hands, a stationary upper body support member for use when the movable upper body support member is not being used, and actuating means within ready reach of the standing occupant for actuating forward and rearward movement of the vehicle, speed control of the vehicle and braking means for the vehicle.

25 Claims, 9 Drawing Figures

OCCUPANT-OPERATED MOBILE WORK VEHICLE FOR PARAPLEGICS

BACKGROUND OF THE INVENTION

Prior art vehicles for supporting paraplegics and others physically handicapped in their legs in standing postures are subject to a number of disadvantages. They have generally not been designed to support the standing occupant's body in various postures necessary for reaching work areas with his hands, such as automobile motors, building parts, work benches, tool storage areas, and other work areas. Because the occupant's center of gravity is higher than when sitting, it has been difficult to achieve stability in this type vehicle as compared to wheelchairs for a sitting occupant. When occupant-standing-type vehicles have been designed with a large base area to provide stability, they have lacked maneuverability around objects and through doors and other restricted areas.

Accordingly, it is an object of this invention to provide an occupant-operated motorized vehicle for supporting a paraplegic in a standing position which is stable, maneuverable and will support the paraplegic's upper body in various working positions to permit him to reach various work areas like motors, building parts, work benches, storage areas, and other work areas, with his hands.

SUMMARY OF THE INVENTION

An occupant-operated motorized vehicle for supporting paraplegics in a standing posture for working with their hands comprising a three-wheeled chassis steered and driven by its rear single wheel, a platform upon which the occupant stands, waist and hip supports for holding the occupant erect and supporting the occupant against backward movement, a rotatable primary upper body support member for supporting the occupant's upper body against forward movement rotatable through about 250° and adapted to be locked at any angle to support the occupant's upper body in various positions as necessary to reach work areas with his hands, a secondary upper body support member for use when the primary upper body support member is not being used, actuating means within ready reach of the standing occupant for actuating forward and rearward movement of the vehicle, speed control of the vehicle and braking means for the vehicle. A feature of the invention is the ratchet-mounted primary upper body support element which permits locking of the support element in any angular position, the positioning of parts to provide balance and stability and the turnbuckle adjustment for the drive chain for the steering mechanism.

DESCRIPTION OF THE PREFERRED EMBODIMENTS

The vehicle is comprised of an upper frame structure and a supporting base structure of triangular configuration upon which the three wheels are mounted. The base triangular structure and supporting wheel structure will now be described.

The front and back of the vehicle as referred to herein is based on the direction the occupant is facing as the vehicle travels, i.e., the twin wheels are at the front of the vehicle and are referred to as the front wheels while the single wheel is at the back of the vehicle and is referred to as the rear wheel.

Figure 1:
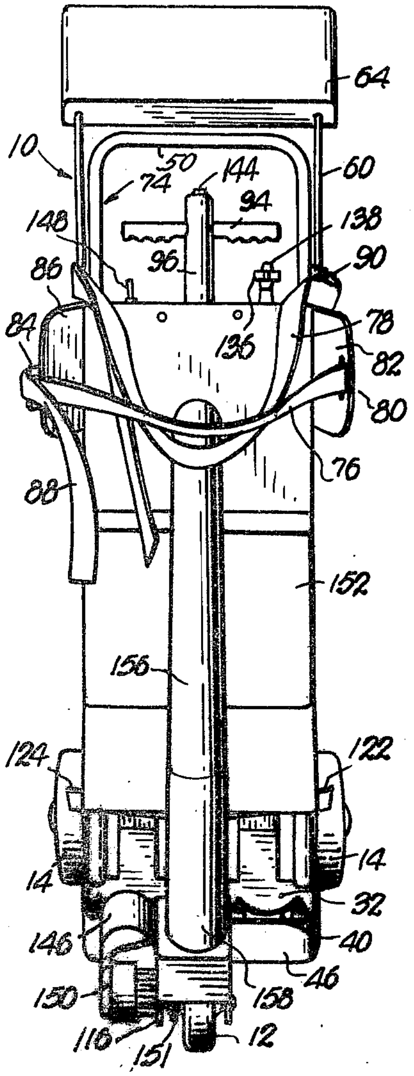
FIG. 1 is a back view of the complete paraplegic's vehicle of the invention.
Figure 5:
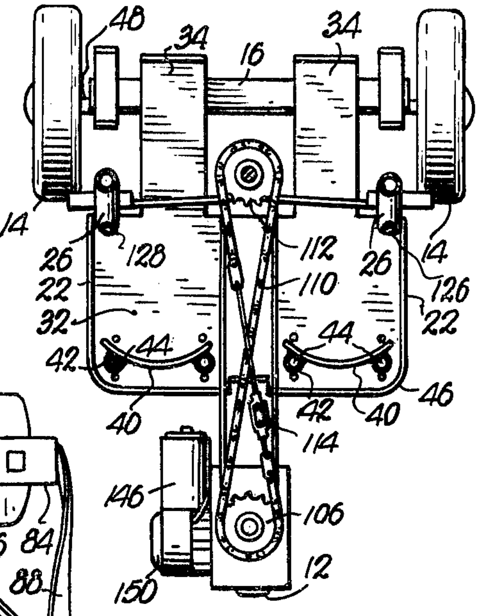
FIG. 5 is a top view of a section taken on line 5—5 of FIG. 3.
Figure 3:
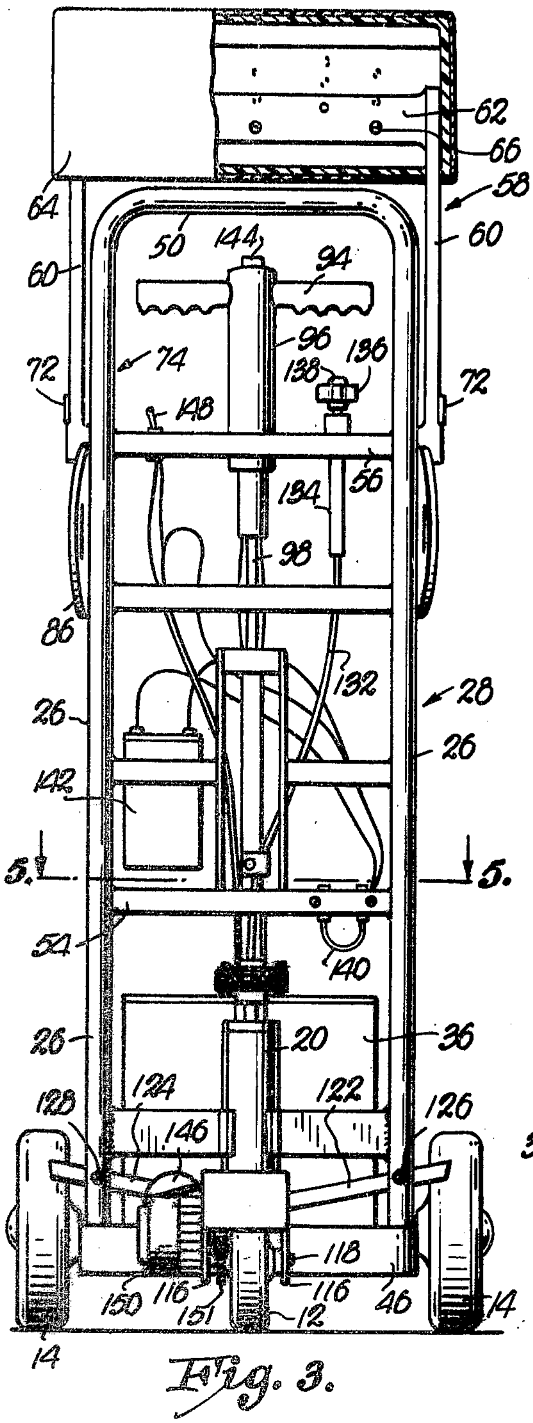
FIG. 3 is a back view of the frame assembly of the vehicle of the invention.
Figure 4:
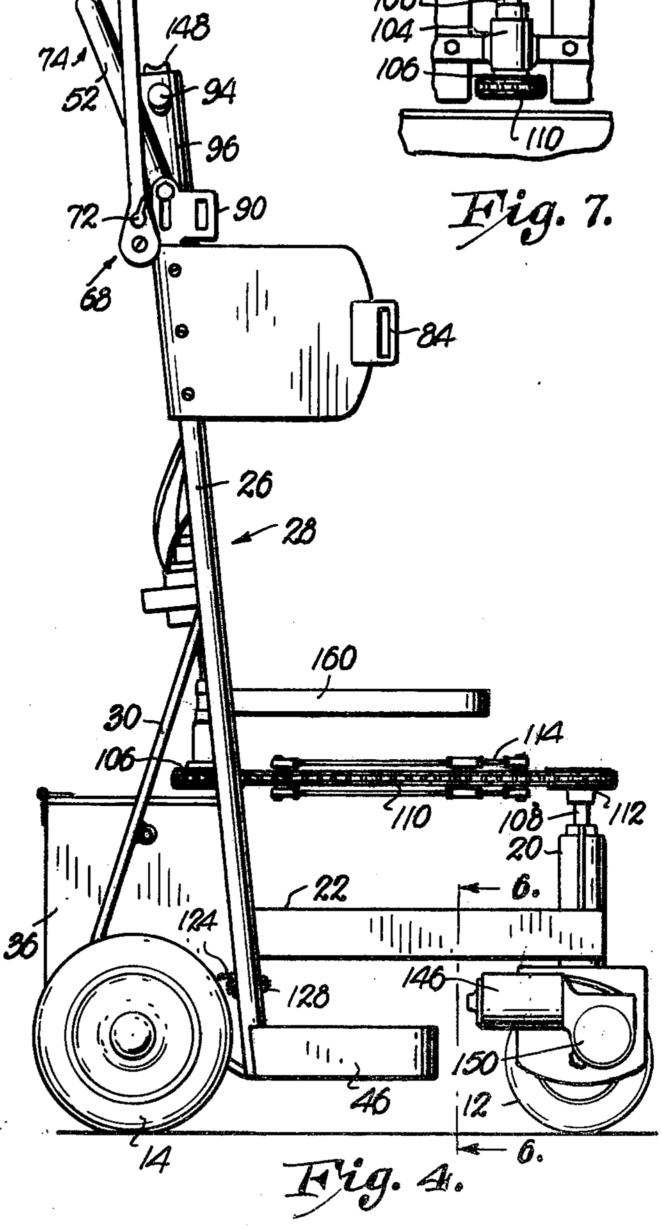
FIG. 4 is a left side view of the frame assembly of the vehicle.

The paraplegic work vehicle of the invention is referred to generally by the numeral 10 (FIG. 1). Referring particularly to FIGS. 3 and 4, the single rear wheel which is both a drive wheel and a steering wheel for the vehicle is indicated by the numeral 12, and the two front wheels are indicated by the numeral 14. The triangular base structure is comprised of the front axle 16 (FIG. 5) forming the approximate base of the triangle, the housing 20 for the terminal or lower steering shaft and the connecting supporting structure between the housing 20 and the front axle 16. The connecting structure is comprised of two horizontal substantially parallel braces 22 secured by their outer ends to housing 2 and by their inner ends to the two legs 26 of U-shaped main frame member 28 of the upper frame structure. Vertically oriented rear braces 30 (FIG. 4) on each side of the vehicle are welded at their upper ends to the respective rear side of legs 26 and by their lower ends to front axle 16. Frame structure connects the legs 26 with rear axle 16. The described structure provides a triangular base with the parts securely fastened together.

A platform 32 (FIG. 1) for supporting the feet of the occupant while in standing position is welded or otherwise secured to the ends of legs 26 to extend rearwardly. Two footrests 34 (FIG. 5) for the front of occupant's feet are welded in spaced apart relation to the front of platform 32 and extend forwardly over the front axle 16. The platform may be provided with a peripheral upstanding rim 46. The part of the axle between footrests 34 is used to support a compartment 36 (FIG. 3) for a battery.

The platform 32 may be braced for support in any conventional manner such as by means of metal supporting strips (not shown), each welded by one end at one side of the platform and welded to the bottom of axle 16 with their distal ends bent to provide a support for the battery container.

The platform 32 is planar in structure and provided with heel stops 40 (FIG. 5) of curved conformation, having attached thereto sleeves 42 which fit over supporting pins 44. There are three pairs of supporting pins 44 horizontally spaced on the face of the platform which provide three different adjustments for the heel stop 40 to conform to different sized shoes. For safety purposes, the platform 32 is provided with peripheral rim 46.

Front wheels 14 are mounted to subshafts 48 (FIG. 5) of front axle 16 as conventional with the use of bearing races, and other standard parts. The front wheels are free-wheeling.

Figure 2:
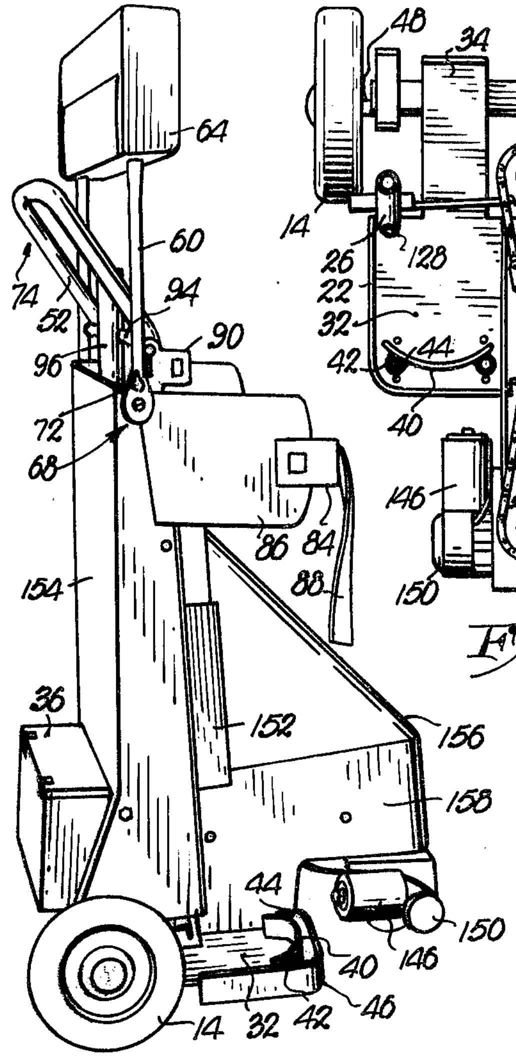
FIG. 2 is a left side view of the vehicle of FIG. 1.

The upper frame structure of the vehicle is comprised of main frame member indicated generally at 28 (FIG. 3) which is itself comprised of legs 26 joined at their tops by bridge 50. The main frame member 28 is constructed with a rearwardly angled top support portion 52 (FIG. 2), the purpose of which will be described later. The main frame 28 is provided with cross-braces 54 and 56 and a lower cross brace (not shown) securely welded at their ends to the inner surfaces of the legs 26. These braces serve the dual function of adding strength to the upper frame member 28 and also supporting accessory parts of the vehicle. Any number of equipment supporting braces may be added. A vertical brace (not shown) extends centrally from the upper cross brace to the lower cross brace.

A primary upper body support 58 (FIG. 3) is rotatably or movably mounted by a manner to be described to the upper section of the frame member 28 to support the upper body of the occupant with his chest resting against the back side of the upper body support member. The primary upper body support member is constructed with support arms 60 connected at their outer ends by bridge member 62 and mounted at their lower ends to the upper section of main support member 28. A body contact member 64 is adjustably mounted over the bridge portion 62 of the frame of the primary upper body support member. This member can be adjusted by raising or lowering it by means of adjusting screws 66 and their mating holes.

Figure 8:
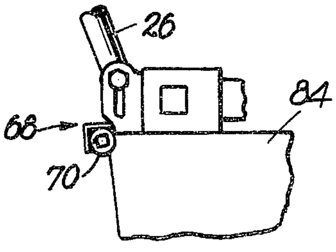
FIG. 8 is a cut away fragmentary section taken in the area of the attachment of the rotatable primary upper body rest member to the main frame.

The primary upper body support member 58 is rotatably attached at its lower ends to the main frame member 28 by conventional socket ratchets indicated generally at 68 (FIG. 4). The ratchet for each leg is inserted into a socket 70 (FIG. 8) welded to cross brace 56 and the respective leg 26 of the main frame member 28. To mount the upper body support member 58 and assemble the ratchet and socket one ratchet is assembled in its socket by fitting the tongue member on the ratchet in the holding slots in the socket and the other ratchet assembled likewise in its socket, spreading the support arms if necessary. The ratchets are locked in their sockets by a small ball held in place by the actuating button so that the ball and ratchets can be released by pressing the button. The ratchets are reversely mounted so that they can be locked in any desired angular position of the primary upper body support member 58 by locking them both against movement. The ratchets can be removed by pressing the ratchet button 72 to permit complete removal of the upper body support when it is not needed to support the occupant in a work position. Other conventional means can be used for adjustably mounting the primary upper body support 58. The primary upper body support member 58 can be folded down in front of the vehicle when it is not needed and the secondary body support used instead. The adjustability of the primary upper body support member 58 in cooperation with the angled secondary upper body support 74 over which it rotates provides support for the upper body of the occupant to permit him to work on areas removed from the front of the vehicle, such as, an automobile motor and accessories under the raised hood of an automobile. The stability of the device afforded by its triangular base structure and the arrangement of the accessories carried by the device so that their weights are counterbalanced, permits the occupant to work with his upper body resting on the primary upper body support beyond the front of the vehicle without danger of tipping. When it is necessary to support the upper body of the occupant at a large forward angle at the work area the primary upper body support member can be removed or locked against the front of the vehicle and the secondary upper body support member used accompanied by locking the brakes and tipping the vehicle forwardly.

The vehicle is provided with two flexible support belts 76 and 78 (FIG. 1) for holding the occupant in the vehicle against backward movement, belt 76 being a hip belt and belt 78 being a waist belt. Hip belt 76 is securely attached by one end to belt eye 80 in the end of hip pad 82 and its other end is removably threaded through belt eye 84 (FIG. 4) in hip pad 86. The section of the belt 88 extending beyond belt eye 84 is provided with a conventional adjustable locking device such as that for automobile seat belts. Waist belt 78 is similarly adjustably mounted in belt eyes 90 (FIG. 4) securely attached to the upper section of main frame member 28. The hip pads 82 and 86 are of flexible material to permit adjustment to fit snugly against the occupant's hips.

The steering mechanism for the vehicle will now be described.

Figure 7:
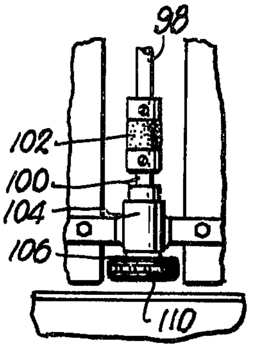
FIG. 7 is a cut away fragmentary section taken in the area of the coupling of the steering shaft to the drive chain.

A horizontally mounted steering cross bar 94 (FIG. 3) is mounted on upper steering shaft housing 96. The steering bar 94 is attached to upper steering shaft 98 and housing 96 so that the shaft can be rotated right or left by turning the steering bar 94 in the corresponding direction. Referring to FIG. 7, the upper steering shaft 98 is connected to the middle steering shaft section 100 by a conventional flexible coupling 102 to compensate for the different angles in the steering shafts when the steering mechanism is in use. The lower end of the upper steering shaft 98 is securely locked in the upper end of flexible coupling 102. The middle steering shaft section 100 has its upper end secured in the flexible coupling 102 and its lower end mounted in conventional bearing housing 104. The middle steering shaft 100 extends through the bearing housing 104 and is attached at its lower end to steering sprocket 106. The rotary motion of the upper steering shaft 98 in response to movement of the steering crossbar 94 is transmitted to the lower steering shaft 108 (FIG. 4) in housing 20 by means of drive chain 110 horizontally mounted between chain sprockets 106 and 112 and in mesh therewith. The length of drive chain 110 can be adjusted by means of a conventional turnbuckle arrangement 114 (FIG. 5) mounted in the chain in an area which does not pass over the sprockets 106, 112 in the limited movement of steering bar 94. The terminal shaft 108 securely attached to sprocket 112 extends into the housing 20 and is securely attached to steering yoke 116 (FIG. 3) attached by its lower ends to rear axle 118 of rear wheel 12 so that movement of terminal steering shaft 108 will turn rear wheel 112 by conventional means. From the above description of the steering mechanism, it will be seen that motion of the steering bar 102 will be transmitted through the steering shafts 98, 108 connected by the flexible coupling 102 to steering sprocket 106 and from there through steering drive chain 110 to steering sprocket 112 and from there through terminal shaft 108 to the steering yoke 116 to turn the rear wheel 12. Because of the crossed drive chain 110, the vehicle steers like an automobile, i.e., when the steering bar is turned left the vehicle turns left.

Figure 6:
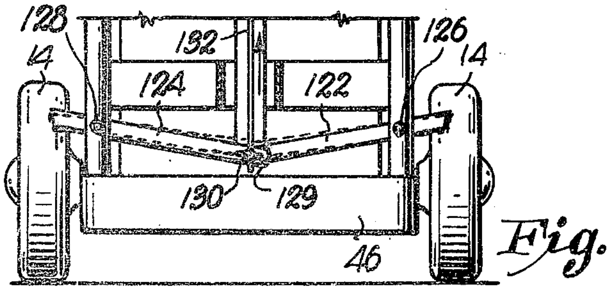
FIG. 6 is a section taken on line 6—6 of FIG. 4.

The braking mechanism for the vehicle will now be described with reference to FIGS. 3 and 6. The braking elements are the brake rods 122 and 124 which are rotatably mounted on arms 26 of the main frame member 28 by means of pins 126 and 128, respectively. The inner ends of the brake rods are provided with longitudinally extending slots 129 as shown in FIG. 6 and slidably connected by means of connecting pin 130 attached to brake cable 132. The outer ends of brake rods 122, 124 extend between the inner and outer peripheries of the tires on front wheels 14 and from the rest position above the center of the tires can be moved downwardly to contact the outer peripheries of the tires to provide the braking action, so that as the brake cable 132 is pulled upwardly and the inner ends of the brake rods move upwardly with it, the outer ends of the brake rods will be pivoted downwardly to contact the tires of the wheels 14 and produce a braking action on the wheels 14. The brake cable 132 extends upwardly through brake shaft housing 134 which is mounted on crossbar 56 which might be referred to as the control panel because of the instruments mounted on it. The brake cable mechanism is of conventional vernier construction. The brake cable 132 has a control knob 136 securely attached to its upper end. The braking action is applied through this conventional construction by pushing the button 138 on the control knob 136 downwardly and pulling up on the knob. For releasing the brake, the button 138 is pressed downwardly. The knob will also be released by turning it counterclockwise.

Figure 9:
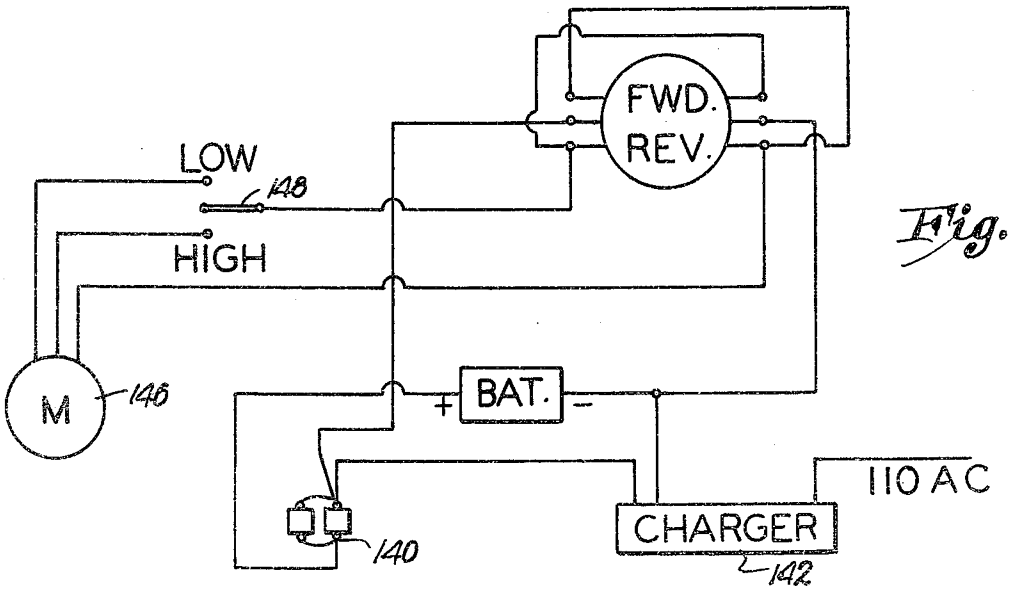
FIG. 9 is a schematic circuit diagram of the electrical circuit for powering the vehicle of the invention.

The motive power mechanism for the vehicle will now be described. A schematic circuit diagram is depicted in FIG. 9 which shows the electrical circuitry through which power is transmitted to the motor to operate the vehicle, and to perform other functions. A conventional battery housed in battery housing 36 is mounted on battery support area (FIG. 5). between footrests 34. The circuit breakers 140 are mounted on crossbrace 54. Battery charger 142 is mounted on one of the crossbraces. The motor is actuated to the forward and reverse position in accordance with the circuit diagram by means of motor control button 144 mounted in upper steering shaft housing 96 and connected to the motor 146. The speed of the motor can be adjusted by means of the speed control switch 148 mounted on crossbrace 56 and in electrical connection with the motor. It will be noted from the above description that all of the controls, vis., the steering control, the brake control, the directional control, and the speed control, are located within easy reach of the occupant.

The motor 146 (FIG. 3) is mounted to the left side of steering yoke 116 with driving gear 150 of the motor attached to the end of its drive shaft. The driving gear 150 is in mesh with drive gear 151 attached to the axle 118 of power wheel 12 for driving the power wheel 12 by motor 146. Motor 146 is a conventional battery powered motor.

For the comfort of the occupant, a knee pad 152 (FIG. 2) is mounted on the upper frame structure facing the occupant. The frame structure is enclosed by rear panel cover 154, outer shroud 156, and front panel cover 158 securely attached as shown by means of screws, bolts or other conventional means. The shroud 156 is mounted over U-shaped brace 160 (FIG. 4) attached to the upper support frame, and as shown in FIG. 1, provides a spacer and support for the legs and feet of the occupant. It is to be noted that this spacer serves the additional function of housing part of the chain drive mechanism, the housing 20 and connecting braces 22, with the result that along with the other panelling, the vehicle has an attractive outward appearance.

In using the vehicle, the occupant can enter it from a wheelchair, automobile and other transport means. In entering the vehicle, occupant places both feet on the platform or footplate 34 with his heels back against the heel stops 40 and then places both knees against the knee pad 152. He then grasps parts of the upper structure such as the top of primary upper body support 58 with one hand and one hip pad with the other hand, and pulls himself to a standing position with the divider 156 supporting his legs spaced apart. He then secures the support belts 76 and 78 to lock himself in position in the vehicle. The motor can then be actuated to drive the vehicle wherever the occupant desires to go. If the vehicle is to be used to support the occupant while he is working, it is parked beside the work area and the primary upper body support member 58 adjusted by means of the ratchet adjustment means to a convenient position to permit occupant to reach the work area with his hands. If the work is to be performed in areas where the primary upper body support is not needed, it can be completely removed by pressing ratchet locking pin 72 or it can be rotated forwardly until it lies against the front of the vehicle. Occupant can then use the upper angled section 52 for a secondary upper body support. The secondary upper body support can be hinged or rotatably mounted in a manner similar to that used for the primary upper body support. The protection for the knees can take the form of a continuous pad or it can be two separate pads.

It is thus seen from the above-described construction that a work vehicle has been provided for a paraplegic or other incapacitated individual which supports him in standing position, is stable against tipping, provides for positioning of the occupant's upper body in any desired orientation to permit working on areas spaced from the front of the vehicle, provides easy access to all actuating and control elements, insures that power is always available for the motor, has safe and secure support for the occupant, and possesses other advantages of simplicity, stability and others. The stability and ease of operation provided by the construction of the vehicle will obviously contribute to the psychological well-being of the incapacitated occupant.

While the invention has been illustrated by the use of conventional equipment, such as, the ratchet adjusting means, the motor, the chain drive steering mechanism, the braking mechanism, and other conventional elements, it is obviously not limited to these particular elements, as equivalent elements may be used.

What is claimed is:

1. An occupant-operated motor driven vehicle for supporting paraplegics in a standing posture comprising:

(a) a base support structure supported on at least two front wheels and at least one rear wheel;

(b) an upper support structure;

(c) platform support means on said base support structure for supporting said paraplegic in standing position in said vehicle;

(d) a primary adjustable upper body support member rotatably attached to said upper support structure to rotate forwardly of said two front wheels clearing the vehicle structure and adapted to support the standing occupant's upper body in various positions against forward movement;

(e) body support means attached to said vehicle for supporting the standing occupant in said vehicle against backward movement;

(f) power means mounted on said vehicle for propelling said vehicle;

(g) steering means for said vehicle;

(h) braking means for said vehicle; and (i) control means attached to said upper support structure within easy reach of the standing occupant for controlling the speed and direction of movement of said vehicle.

2. The vehicle of claim 1 including vertically-oriented divider means located centrally of said vehicle for maintaining the legs of the standing occupant in said vehicle separated.

3. The vehicle of claim 1 including secondary upper body support means attached to said upper support structure dimensioned to permit rotation of said primary upper body support member over it and adapted to support the standing occupant's upper body against forward movement when said primary upper body support member is in inoperative position or removed from the vehicle.

4. The vehicle of claim 1 in which said primary upper body support member comprises two arms rotatably attached at their lower ends to said upper support structure and their upper ends supporting a body contact member upwardly spaced from the attachment points of said lower ends.

5. The vehicle of claim 3 in which said primary upper body support member comprises two arms rotatably attached at their lower ends to said upper support structure and their upper ends supporting a body contact member upwardly spaced from the attachment points of said lower ends.

6. The vehicle of claim 1 including control means for said braking means within easy reach of the standing occupant.

7. The vehicle of claim 1 including control means for said steering means within easy reach of the standing occupant.

8. The vehicle of claim 1 in which said upper body support member is rotatable through 250°.

9. The vehicle of claim 1 in which said body support means supporting the standing occupant's body against backward movement comprises flexible belt means attached to said vehicle and provided with length adjustment means.

10. The vehicle of claim 1 in which said primary upper body support member is rotatably attached to said upper support structure by ratchet means provided with locking means for locking said upper body support member in a desired position.

11. The vehicle of claim 1 in which said wheels include two free-wheeling front wheels and one turning and power rear wheel and in which said steering means comprises an upper steering shaft mounted on said upper body structure, a lower steering shaft mounted on said upper body structure, flexible coupling means between said upper and lower steering shafts, steering means attached to the rear wheel of said vehicle, a first chain sprocket mounted on said upper body support, a steering gear shaft, a second chain sprocket mounted on said steering gear shaft, a drive chain mounted on said chain sprockets, and turnbuckle means for adjusting the length of said drive chain means.

12. In a motorized vehicle for supporting paraplegics in standing position including lower support structure, upper support structure, at least two front wheels and at least one rear wheel supporting said lower support structure, power means for powering said vehicle, support means for supporting the standing occupant in said vehicle, control means for controlling the operation of said vehicle, the improvement comprising a primary upper body member rotatably attached to said upper body support to rotate forwardly, of said two front wheels, clearing the vehicle's structure and adapted to be locked in a desired position for supporting the standing occupant's upper body against forward movement in a position to permit him to reach a work area with his hands.

13. The vehicle of claim 12 including secondary upper body support means attached to said upper support structure dimensioned to permit rotation of said primary upper body support member over it and adapted to support the standing occupant's upper body against forward movement when said primary upper body support member is in inoperative position.

14. The vehicle of claim 13 in which said primary upper body support member comprises two arms rotatably attached at their lower ends to said upper support structure and their upper ends supporting a body contact member upwardly spaced from said attachment points of said lower ends.

15. An occupant-operated motor driven vehicle for supporting paraplegics in a standing posture comprising:

(a) a base support structure supported on at least two front wheels and at least one rear wheel;

(b) an upper support structure including an inverted U-shaped secondary upper body support member having upstanding legs joined at their upper ends with a bridge member, the legs extending forwardly of said two front wheels of the vehicle so that the bridge is adapted to support the upper body of the standing occupant at an angle forwardly of said two front wheels;

(c) platform support means on said base support structure for supporting said paraplegic in standing position in said vehicle;

(d) body support means attached to said vehicle for supporting the standing occupant in said vehicle against backward movement;

(e) power means mounted on said vehicle for propelling said vehicle;

(f) steering means for said vehicle;

(g) braking means for said vehicle; and (h) control means attached to said upper support structure within easy reach of the standing occupant for controlling the speed and direction of movement of said vehicle.

16. An occupant-operated motor driven vehicle for supporting paraplegics in a standing posture comprising:

(a) a base support structure;

(b) at least two spaced apart front wheels and at least one rear wheel supporting said base support structure;

(c) an upper support structure;

(d) platform support means on said base support structure for supporting said paraplegic in standing position in said vehicle;

(e) body support means attached to said upper body structure for supporting said paraplegic against forward movement;

(f) body support means attached to said vehicle for supporting the standing occupant in said vehicle against backward movement;

(g) power means mounted on said vehicle for propelling said vehicle;

(h) steering means for said vehicle;

(i) braking means for said vehicle operatively connected to at least one of said front wheels for braking it, and (j) control means attached to said upper support structure within easy reach of the standing occupant for controlling the speed and direction of movement of said vehicle.

17. The vehicle of claim 16 in which said body support means comprises a primary adjustable upper body support member rotatably attached to said upper support structure to rotate forwardly beyond said front wheels clearing the vehicle structure and adapted to support the standing occupant's upper body in various positions against forward movement.

18. The vehicle of claim 16 in which said body support means comprises an inverted U-shaped secondary upper body support member attached to said upper support structure and having upstanding legs joined at their upper ends with a bridge member, the legs extending forwardly of said front wheels of the vehicle so that the bridge is adapted to support the upper body of the standing occupant at an angle forwardly of the vertical axis of the vehicle.

19. An occupant-operated motor driven vehicle for supporting paraplegics in a standing posture comprising:

(a) a base support structure supported on at least two front wheels and at least one rear wheel;

(b) an upper support structure;

(c) platform support means on said base support structure for supporting said paraplegic in standing position in said vehicle;

(d) a primary adjustable upper body support member rotatably attached to said upper support structure to rotate forwardly of said two front wheels clearing the vehicle structure and adapted to support the standing occupant's upper body in various positions against forward movement;

(e) body support means attached to said vehicle for supporting the standing occupant in said vehicle against backward movement;

(f) power means mounted on said vehicle for propelling said vehicle;

(g) steering means for said vehicle;

(h) braking means for said vehicle;

(i) control means attached to said upper support structure within easy reach of the standing occupant for controlling the speed and direction of movement of said vehicle; and (j) vertically oriented divider means located centrally of said vehicle for maintaining the legs of the standing occupant in said vehicle separated, said divider means at its base extending substantially from the rear of said base support structure to the front of said platform support means, being in the form of a hollow shroud, and serving as a housing for auxillary equipment of said vehicle.

20. An occupant-operated motor drive vehicle for supporting paraplegics in a standing posture comprising;

(a) a base support structure supported on wheels;

(b) an upper support structure;

(c) platform support means on said base support structure for supporting said paraplegic in standing position in said vehicle;

(d) a primary adjustable upper body support member comprising two arms rotatably attached at their lower ends to said upper support structure and their upper ends supporting a body contact member, and said upper body support member rotatably attached to said upper support structure for supporting the standing occupant's upper body in various positions against forward movement;

(e) U-shaped secondary upper support means attached to said upper support structure dimensioned to permit rotation of said primary upper body support member over it and adapted to support the standing occupant's upper body against forward movement when said primary upper body support member is in inoperative position or removed from the vehicle, said secondary upper body support means including two upwardly extending arms attached to said upper support structure having a connecting bridge between their upper ends, said secondary upper body support member being mounted between the arms of said primary upper body support member with its bridge radially inside said body contact member;

(f) body support means attached to said vehicle for supporting the standing occupant in said vehicle against backward movement;

(g) power means mounted on said vehicle for propelling said vehicle;

(h) steering means for said vehicle;

(i) braking means for said vehicle; and (j) control means attached to said upper support structure within easy reach of the standing occupant for controlling the speed and direction of movement of said vehicle.

21. The vehicle of claim 20 in which said secondary upper body support member is fixedly attached at a forward angle to said upper support structure.

22. An occupant-operated motor drive vehicle for supporting paraplegics in a standing posture comprising:

(a) a base support structure supported on wheels;

(b) an upper support structure;

(c) platform support means on said base support structure for supporting said paraplegic in standing position in said vehicle, said platform means being provided with heel stops on its upper surface and foot length adjustment means for positioning said heel stops in accordance with the feet length of the occupant;

(d) a primary adjustable upper body support member rotatably attached to said upper support structure for supporting the standing occupant's body in various positions against forward movement;

(e) body support means attached to said vehicle for supporting the standing occupant in said vehicle against backward movement;

(f) power means mounted on said vehicle for propelling said vehicle;

(g) steering means for said vehicle;

(h) braking means for said vehicle; and (i) control means attached to said upper support structure within easy reach of the standing occupant for controlling the speed and direction of movement of said vehicle.

23. An occupant-operated motor driven vehicle for supporting paraplegics in a standing posture comprising;

(a) a base support structure supported on wheels;
(b) an upper support structure;
(c) platform support means on said base support structure for supporting said paraplegic in standing position in said vehicle;
(d) a primary adjustable upper body support member rotatably attached to said upper support structure for supporting the standing occupant's body in various positions against forward movement;
(e) body support means attached to said vehicle for supporting the standing occupant in said vehicle against backward movement;
(f) power means mounted on said vehicle for propelling said vehicle,
(g) steering means for said vehicle;
(h) braking means for said vehicle;
(i) control means for said braking means within easy reach of the standing occupant, said braking means comprising a brake cable attached at its upper end to said brake control means, brake rods rotatably mounted near their outer ends to said upper body structure near the base structure with their outer ends adpated to contact said wheels, slots in the inner ends of said brake rods, a connecting pin slidably mounted in said plate, and the lower end of said cable attached to said connecting pins;
(j) control means attached to said upper support structure within easy reach of the standing occupant for controlling the speed and direction of movement of said vehicle.

24. An occupant-operated motor drive vehicle for supporting paraplegics in a standing posture comprising:

(a) a base support structure supported on wheels;
(b) an upper support structure;
(c) platform support means on said base support structure for supporting said paraplegic in standing position in said vehicle;
(d) a primary adjustable upper body support member rotatably attached to said upper support structure for supporting the standing occupant's body in various positions against forward movement;
(e) body support means attached to said vehicle for supporting the standing occupant in said vehicle against backward movement;
(f) power means mounted on said vehicle for propelling said vehicle;
(g) steering means for said vehicle;
(h) braking means for said vehicle;
(i) control means attached to said upper support structure within easy reach of the standing occupant for controlling the speed and direction of movement of said vehicle;
(j) said wheels, including two free-wheeling front wheels and one turning and power rear wheel;
(k) said steering means comprising an upper steering shaft mounted on said upper body structure, a lower steering shaft mounted on said upper body structure, flexible coupling means between said upper and lower steering shafts, steering means attached to the rear wheel of said vehicle, a first chain sprocket mounted on said upper body support, a steering gear shaft, a second chain sprocket mounted on said steering gear shaft, a drive chain mounted on said chain sprockets, and turnbuckle means for adjusting the length of said drive chain means; and
(l) a vertically oriented housing mounted on said base support structure for maintaining the standing occupant's legs apart and housing said steering means.

25. In a motorized vehicle for supporting paraplegics in standing position including lower support structure, upper support structure, wheels supporting said lower support structure, power means for powering said vehicle, support means for supporting the standing occupant in said vehicle, control means for controlling the operation of said vehicle, the improvement comprising a rotatable primary upper body member adapted to be locked in a desired position for supporting the standing occupant's upper body in a position to permit him to reach a work area with his hands, said primary upper body support member comprising two arms rotatably attached at their lower ends to said upper support structure and their upper ends supporting a body contact member, said vehicle including secondary upper body support means attached to said upper support structure dimensioned to permit rotation of said primary upper body support member over it and adapted to support the standing occupant's upper body against forward movement when said primary upper body support member is in inoperative position, said secondary upper body support means being U-shaped and mounted to said upper support structure between the arms of said primary upper body support member with its bridge radially inside said body contact member.

* * * * *